United States Patent Office 2,995,442

Patented Aug. 8, 1961

2,995,442

REPRODUCTION MATERIAL

Maximilian P. Schmidt and Oskar Sus, Wiesbaden, Biebrich, Germany, assignors, by mesne assignments, to Azoplate Corporation, Murray Hill, N.J., a corporation of New Jersey No Drawing. Filed Apr. 2, 1958, Ser. No. 725,801
Claims priority, application Germany Feb. 25, 1955
31 Claims. (Cl. 96—33)

The present invention concerns the production of copies from originals. More particularly, it is concerned with the production of a material comprising a support layer coated with a light sensitive water soluble or water swellable colloid layer.

For several decades, papers and foils which were light sensitized by means of diazo compounds have been in use in the graphic arts. They are widely used for the reproduction of drawings and other transparent originals. Many attempts have been made in the photo-reproduction field to replace the chromates, which in combination with water soluble colloids, are used in a series of technically important processes, e.g. in copper intaglio printing, zinc plate printing, offset printing, photo-lithographic processes, and in the production of pigment papers. Recently, suggestions have been made to replace the chromates used in offset printing, by higher molecular diazo compounds.

However, in those diazotype processes in which water soluble colloids must be used for the production of tanned images, e.g. for making collotypes or for the copper intaglio printing process, chromates are still used, in spite of their being poisonous and having other disadvantages.

It is one object of the present invention to provide a novel reproduction material consisting of a layer support and a light sensitive, water soluble or water swellable colloid layer coated thereon, free from chromates, which can be used for the production of tanned images.

A further object of the invention is the use of certain quinone diazides in a colloid layer coated on a base material to produce tanned images upon exposure to a light image.

The light sensitive substances to be used according to this invention in the colloid layer are sulfonic or carboxylic acids, and the salts of such sulfonic or carboxylic acids, of p-quinone-diazide sulfonic acid amides, the amides containing two or more p-quinone-diazide sulfonamide groups in their molecules. The colloid being the most important component of the novel reproduction material, these light sensitive substances are mostly used in a minor amount as compared with the amount of colloid in the colloid layer. The major portion of the layer is in general the colloid. Layers containing more than 60% of the light sensitive substance are not within the scope of this invention.

The reproduction material prepared according to the present invention, after it is exposed under a transparent original and developed by treatment with water, results in tanned images which are very suitable for numerous purposes in the reproduction field.

Heretofore it was known that neither the ortho- and para-benzoquinone-diazide sulfonic acids and paranaphthoquinone-diazide sulfonic acids, nor the sulfonic acids of o-quinone-diazide sulfonic esters or o-quinone-diazide sulfonic acid amides (even if they contained several light sensitive o-quinone diazide residues in their molecules) were capable of hardening water soluble colloids to such a degree that suitable tanned images are obtained by light exposure and subsequent development with water. It was, therefore, very surprising to determine that the specific group of bis-compounds of the invention could accomplish the purpose.

The compounds, which must be present as the light sensitive substance in the colloidal layer, can be mixed with various water soluble or water swellable colloids and then be used for the production of light sensitive layers, by coating the solution onto a suitable support, in a manner similar to the way known chromate layers are made.

Colloids suitable for use in accordance with the present invention are either natural colloids, such as gelatine or casein; or synthetic colloids, e.g. highly viscous polyvinylpyrrolidones, acrylic acid amides, polyvinyl alcohol, or similar water soluble or water swellable substances. Dyestuffs, sensitizers, pigments or plasticizers, e.g. glycerine, may be added to the colloid layers, as well as other additives customarily used in diazotype processes.

According to one method of the present invention, a water swellable colloid layer, e.g. a gelatine or cellulose hydrate layer, is sensitized by coating it with a solution of the compound to be used as the light sensitive substance.

One method of producing the light sensitive substance in the colloid layer is, for example, by causing p-quinone-diazide sulfonic acid chlorides to react with aromatic amino sulfonic acids or amino carboxylic acids containing two or more amino groups or in addition to amino at least one hydroxy group in their aromatic nucleus. Alternatively, the sulfonic acids and carboxylic acids of p-nitro-hydroxy-aryl sulfonic acid amides which are prepared by known methods, are first reduced to the corresponding p-amino-hydroxy compounds and then transformed into the sulfonic acids and carboxylic acids of p-quinone-diazide sulfonic acid amides by diazotization.

If the visibility of the tanned images of the invention, obtained after exposure to light, should not be good enough, they can be colored before or after development with water by using dyestuff solutions of, e.g., basic dyestuffs, such as methylene blue or methyl violet. Frequently, a further hardening of the images results from such coloration. However, such hardening effect may also be obtained by an after-treatment with a tanning agent, e.g. formaldehyde.

Suitable base materials or supports for the light sensitive colloid layers may be: Paper, films, plastic foils, metal foils, metal plates and metal cylinders, e.g. of aluminum, zinc, copper or brass, or they may be of glass or textile fabrics.

The light sensitive reproduction material according to the present invention may be used for all processes in which chromates were hitherto used for sensibilization, especially for intaglio and offset printing. It is also of practical importance in obtaining pigment images, copying originals, or for the production of stencils.

The light sensitive layers according to the present invention have an excellent shelf life. As compared with the diazo and nitro compounds previously proposed for the production of tanned images, the new material has the advantage that it bleaches out more strongly, thus avoid weakness in contrast of the images obtained.

The following compounds are discussed in further detail in the examples:

(1)
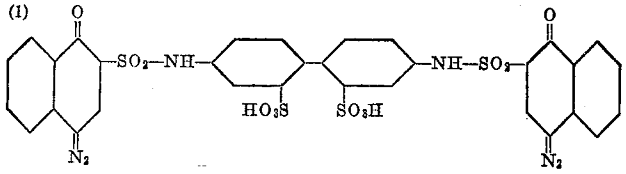
(2)
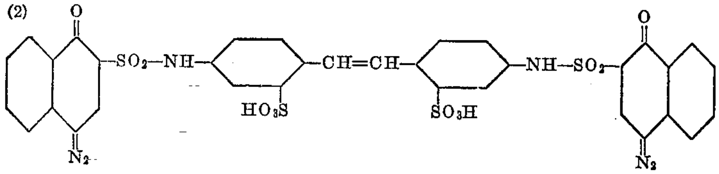
(3)
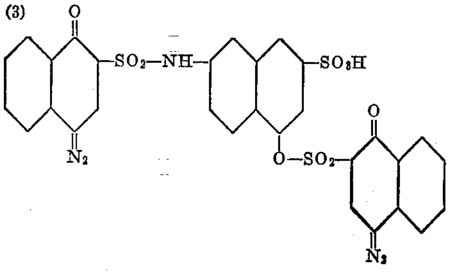
(4)
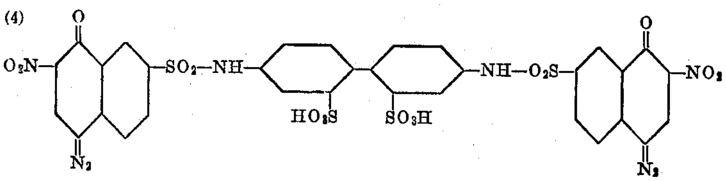
(5)
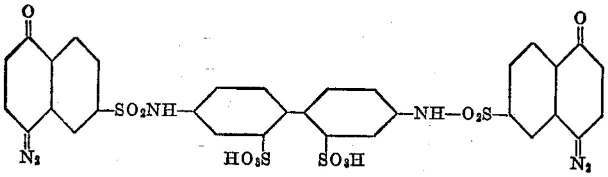
(6)
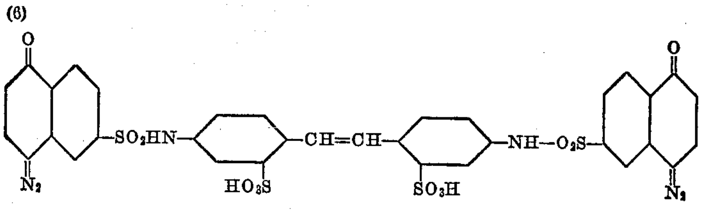
(7)
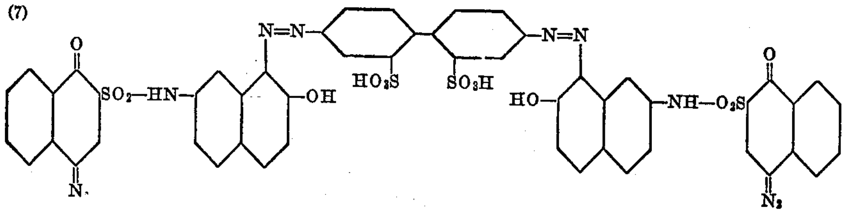
(8)
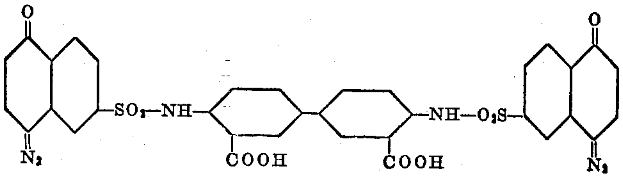

(9)

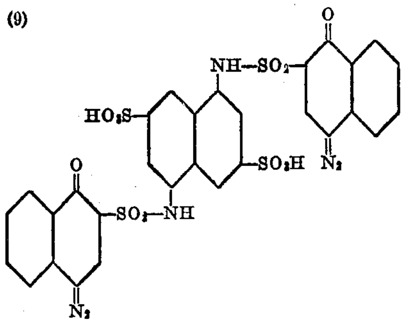

(10)

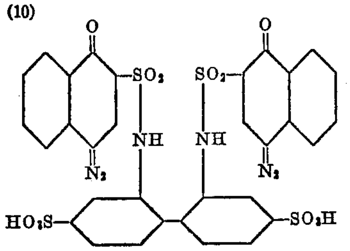

(11)

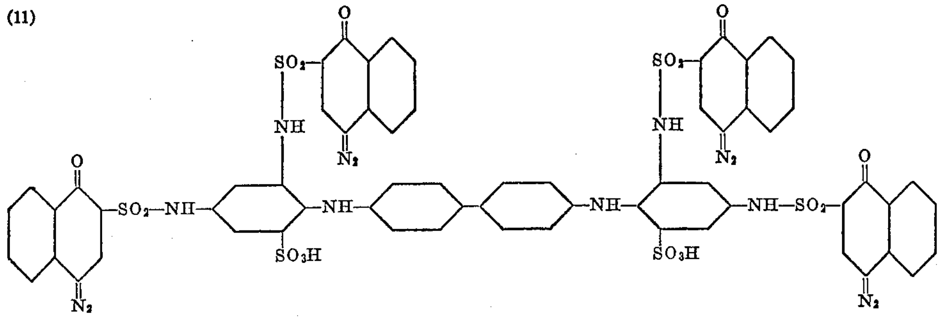

The following examples are inserted in order to illustrate the present invention in the light of said examples. No restriction of the scope of the invention to the subject matter described in the examples is intended.

EXAMPLES

*Example 1*

1.5 g. of the sodium salt of 4,4′-bis-(naphthoquinone-(1″,4″) - diazide - (4″) - 2″ - (sulfonyl - amino) - diphenyl-2,2′-disulfonic acid (corresponding to Formula 1) are dissolved with 10 g. of gelatine in 80 cc. of warm water. The solution is coated e.g. by means of a cotton swab as a thin layer onto a heated aluminum foil, which had been roughened by brushing and then thoroughly dried with warm air. The light sensitive layer is then exposed under a negative screen master, using a closed carbon arc lamp of 18 amp. as a light source. Thereafter the exposed layer is colored by means of a 3% solution of methyl violet or water-blue, and finally rinsed with water of 40° C. Even after an exposure of only 40 seconds a colored positive image becomes visible which may be used for the manufacture of stencils or for printing.

The diazo compound corresponding to Formula 1, or its sodium salt, respectively, is prepared as follows:

16.5 g. of benzidine-2,2′-disulfonic acid are dissolved in a dilute sodium hydroxide solution which was prepared from 200 cc. of water and 35 cc. of 10% sodium hydroxide solution. To said solution there is added 40 g. of chalk and then, after heating the mixture to 70° C., a suspension of 27 g. of naphthoquinone-(1,4)-diazide-(4)-2-sulfochloride in 200 cc. of dioxane is slowly added. After heating for about 2 hours a thick yellow precipitate is formed which is drawn off, washed with cold water, mixed with hot water, and rendered alkaline by adding a sodium carbonate solution, whereupon the condensation product goes into solution in the form of its sodium salt. The solution is then drawn off from the solid particles and mixed with sodium chloride. The mixture is cooled and then the precipitated product is drawn off and washed first with a small quantity of dilute sodium chloride solution and then with some cold water.

The product thus obtained is the sodium salt of the compound corresponding to Formula 1 (a yellow diazo compound), which couples with phloroglucinol in a soda alkaline solution to form a violet dyestuff. The diazo compound is very stable and, under the influence of light, it is capable of tanning colloids, e.g. highly viscous polyvinyl pyrrolidone. Upon adding hydrochloric acid to a solution of the sodium salt of the diazo compound, the almost insoluble free diazo sulfonic acid is obtained.

*Example 2*

A solution containing 1.5% of highly viscous polyvinyl pyrrolidone, 0.15% of the sodium salt of the compound corresponding to Formula 1, and 0.075% of erythrosin, dissolved in aqueous alcohol (50%), is coated onto an aluminum or zinc plate which was superficially roughened by brushing. After drying, the plate is exposed and developed as described in Example 1. Even after an exposure of only 10–20 seconds, a stable violet image is obtained which requires no further coloration and may be used for the production of stencils.

*Example 3*

A solution containing 1.5% of highly viscous polyvinyl pyrrolidone and 1.5% of the sodium salt of the compound corresponding to Formula 2 (condensation product of 2 moles of naphthoquinone-(1,4)-diazide-(4)-2-sulfochloride with 1 mol of 4,4′-diamino-stilbene-2,2′-disulfonic acid) in aqueous alcohol (50%), is coated onto an aluminum foil which was mechanically roughened by brushing. The layer is then dried. The light sensitive colloid layer thus obtained is exposed under a negative screen original, colored with water-blue or methyl violet, and rinsed with water. A colored positive tanned image is obtained.

In order to prepare the sodium salt of the compound corresponding to Formula 2, 3.2 g. of 4,4'-diaminostilbene-2,2'-disulfonic acid are finely dispersed in 20–25 cc. of water and then neutralized by adding sodium hydroxide solution. A solution is formed, and to this solution there are added 6 g. of chalk and a suspension of 5 g. of naphthoquinone-(1,4)-diazide-(4)-2-sulfochloride. The mixture is then heated to 50–70° C. for about 45 minutes, diluted with 100 cc. of hot water, and then rendered alkaline by adding sodium carbonate solution. The mixture is filtered while hot and the filtrate is mixed with 100 cc. of alcohol. Upon cooling the filtrate, the yellow condensation product precipitates in the form of crystals, which are drawn off, washed with 50% alcohol, and dried. In cold water it swells up and forms a yellow solution. Upon addition of hydrochloric acid, the solution thickens to a viscid, gelatinous mass.

*Example 4*

A solution containing 0.3% of the compound corresponding to Formula 3 (condensation product of 1 mol of 2-amino-5-hydroxy-naphthalene-7-sulfonic acid with 2 moles of naphthoquinone-(1,4)-diazide-(4)-2-sulfochloride). 0.15% of erythrosin, and 3% of gelatine in aqueous alcohol (80%), is coated onto a brushed or superficially oxidized almuinum foil and dried. The layer is then exposed under a transparent original, using, a closed carbon arc lamp of 18 amp. as the light source, and then rinsed with water of 40° C. A vividly violet colored image is obtained, which adheres very firmly to the plate even after an exposure of only 15–20 seconds.

Instead of erythrosin, eosin may be used. If erythrosin is not contained in the coating solution, and the plate is exposed for 1½ minutes to the light of an open carbon arc lamp at a distance of 1 m., the image adheres very firmly to the support, when being rinsed with water.

In order to prepare the compound corresponding to Formula 3, 2.4 g. of 2-amino-5-hydroxy-naphthalene-7-sulfonic acid are dissolved in 25 cc. of water and 2.5 cc. of 10% caustic soda solution, to form the sodium salt of the acid. To this solution there is added first a suspension of 5.4 g. of naphthoquinone-(1,4)-diazide-(4)-2-sulfochloride in 25 cc. of dioxane, and subsequently, at a temperature of about 40° C. and with agitation, as much of a 10% sodium carbonate solution as is necessary to obtain a clear solution. The solution is cooled down, poured into 300 cc. of a saturated sodium chloride solution, and slightly heated again. A dark green product precipitates which is drawn off. It is dissolved in a little water, and the solution is first mixed with animal charcoal and then filtered. Hydrochloric acid is added to the filtrate until an acid reaction is obtained, whereupon the condensation product separates, which is then drawn off. It is dissolved in hot alcohol (90%) and the solution is filtered off from the deposit. The product corresponding to Formula 3 crystallizes from the filtrate in the form of brownish-yellow crystals. Upon dissolving this product in dilute sodium carbonate solution, it forms a yellow solution. It does not couple with other diazo compounds.

*Example 5*

An aqueous solution containing 0.1% of the diazo compound corresponding to Formula 4 and 1% of a water-soluble cellulose methyl ether, is coated onto a mechanically roughened aluminum foil and dried. The coated side of the foil is then exposed under a transparent original and washed with a 3% aqueous solution of methylene blue. In the light struck areas, the cellulose methyl ether layer is hardened and accepts the dyestuff, while the unexposed parts of the colloid layer are removed. Thus, from a negative original a plastic positive image is obtained and the foil may now be used as a printing plate. Or the foil may be transformed into a negative printing plate by etching the non-imaged areas of the metallic support.

The diazo compound corresponding to Formula 4 is prepared as follows:

3.2 g. of naphthoquinone-(1,4)-diazide-(4)-2-nitro-7-sulfonic acid are triturated with 4 g. of phosphorous pentachloride, whereupon hydrogen chloride is liberated and the substance assumes the form of a syrup. In order to isolate the sulfonic acid chloride, the reaction mixture is mixed with ice. The solid diazo sulfochloride which is formed, is filtered off and recrystallized from dioxane. The yellow colored compound melts at 180° C., with decomposition.

1.2 g. of benzidine-2,2'-disulfonic acid are dissolved in dilute aqueous sodium hydroxide solution. The solution is mixed while being agitated with 1 cc. of pyridine and with a suspension of 2.4 g. of naphthoquinone-(1,4)-diazide-(4)-2-nitro-7 sulfochloride in 12 cc. of dioxane. Upon slightly warming the mixture a clear solution is formed from which the reaction product precipitates in the form of a thick paste, after agitating for 4 hours. The reaction product is drawn off, dissolved in 10% sodium bicarbonate solution for purification, and reprecipitated with hydrochloric acid. The diazo compound corresponding to Formula 4 is a light brown powder.

*Example 6*

An aqueous solution containing 0.3% of the diazo compound corresponding to Formula 5 and 3% of gelatine is neutralized with sodium bicarbonate and then coated onto a roughened aluminum foil and dried. The foil, thus coated, is then exposed under a negative original and developed with warm water. The positive tanned image thus obtained is subsequently colored with a 3% solution of methyl violet.

If paper is used instead of aluminum as a support, the tanned images obtained can be transferred onto copper cylinders or plates, and printing forms can be made by the copper intaglio printing process.

The diazo compound corresponding to Formula 5 is prepared as follows:

65 g. of crude 4-nitro-1-acetamido-naphthalene-6-sulfonic acid (containing 32% of the pure substance) are boiled for half an hour in a reflux condenser with 200 cc. of 20% sodium hydroxide solution. After a short time, a yellow crystalline precipitate separates from the dark brown solution. This precipitate is drawn off after the solution has cooled and is then washed with a 20% solution of sodium chloride. Thus 60 g. of the disodium salt of 1-hydroxy-4-nitro-naphthalene-6-sulfonic acid are obtained.

60 g. of this disodium salt are dissolved in 700 cc. of water. While agitating, and at a temperature of 5–10° C., 22 cc. of chloro-carbonic acid ethyl ester are carefully added, drop by drop, to the solution. After some time, precipitation of the 1-(carbethoxy)-hydroxy-4-nitro-naphthalene-sulfonic acid begins. Agitation is continued until a sample of the reaction mixture does not show any more signs of a coupling reaction with diazo compounds, which occurs after about 4–5 hours. The precipitate is drawn off and dried at 60° C. Yield=30 g.

38 g. of the above described reaction product are ground in a mortar within 45 g. of phosphorus pentachloride and the reaction mixture is then heated to 120° C. in an oil bath for one hour and while agitating the solution it is poured on ice. The precipitated raw product is dried and recrystallized from a benzene/gasoline mixture. 31 g. of 1-(carbethoxy)-hydroxy-4-nitro-naphthalene-6-sulfonic acid chloride are obtained, which forms yellow prisms having a melting point of 121° C.

10.2 g. of benzidine-2,2'-disulfonic acid are dissolved in 90 cc. of water, containing 4.8 g. of sodium bicarbonate. 7.5 g. of chalk is first added to the solution and then, while carefully agitating and at a temperature of 40–50° C., a solution of 22 g. of 1-(carbethoxy)-hydroxy-4-nitro-naphthalene-6-sulfochloride in 150 cc. of acetone is added. After constantly agitating for 6 hours the reaction is completed. 400 cc. of n-sodium hydroxide solution are added to the reaction mixture, which is then heated for 2 hours to a temperature of 60–70° C. on a water bath. The reaction mixture is boiled up once and nuchared. About 35 g. of sodium dithionite added at temperatures of 80–90° C. to the yellow-brown solution thus obtained. By acidifying the light yellow reduction solution with hydrochloric acid until a Congo red reaction is obtained, the 4,4′-bis-(1″-hydroxy-4″-amino-naphthalene-6″-sulfonyl-amino)-diphenyl-2,2′-disulfonic acid is precipitated. Yield is 15 g.

15 g. of the p-hydroxy-amino compound mentioned above are dissolved in a mixture consisting of 130 cc. of dimethyl formamide and 25 cc. of 18% hydrochloric acid. At a temperature of 0–5° C., and while constantly agitating, 16 cc. of a 20% sodium nitrite solution are added to the solution obtained, over a period of 40 minutes. After two hours the clear solution is gradually mixed with 200 cc. of a 5% hydrochloric acid, while cooling. The diazo compound corresponding to Formula 5 precipitates in the form of a light yellow amorphous mass. Yield is 14.5 g.

*Example 7*

0.15 g. of the diazo compound corresponding to Formula 6 and 1.5 g. of a highly viscous polyvinyl pyrrolidone are dissolved in 100 cc. of 50% ethanol, and the solution is then neutralized with sodium bicarbonate. A roughened aluminum foil is coated with this solution, dried, and then exposed under a negative transparent original. The exposed foil is rinsed with water, and the positive relief image thus obtained is colored with a 3% solution of methyl violet. A printing plate is obtained.

The diazo compound corresponding to Formula 6 is prepared as follows:

3.7 g. of 4,4′-diamino-stilbene-2,2′-disulfonic acid are dissolved in 30 cc. of water, which also contains 1.6 g. of sodium bicarbonate. The solution is first mixed with 2.5 g. of chalk and then, while agitating, at a temperature of 40–50° C., 8 g. of 1-(carbethoxy)-hydroxy-4-nitro-naphthalene-6-sulfochloride in 60 cc. of acetone are carefully added, drop by drop. After five hours, the reaction is finished. 150 cc. of n-sodium hydroxide solution are added to the reaction mixture, which is then heated for two hours on a water bath. After a short boiling the reaction mixture is nuchared. By gradually adding 12 g. of sodium dithionite to the filtrate, the nitro compound is reduced to the 4,4′-bis-(1″-hydroxy-4″-aminonaphthalene-6″-sulfonyl-amino)-stilbene-2,2″-disulfonic acid, which, upon acidifying, separates in the form of a colorless precipitate. Yield 55 g.

5 g. of the above mentioned p-amino-hydroxy-compound are dissolved in a mixture of 50 cc. of dimethyl formamide and 10 cc. of 16% hydrochloric acid. While agitating, and at a temperature of 0–5° C., 5.6 g. of 20% sodium nitrite solution are added to the solution thus obtained. After two hours' agitation the clear solution is nuchared and the filtrate mixed with 60 cc. of 3% hydrochloric acid. The diazo compound corresponding to Formula 6 precipitates as a brownish yellow amorphous precipitate.

*Example 8*

An aqueous dioxane solution (50%) containing 1.5% of highly viscous polyvinyl pyrrolidone and 0.15% of the diazo dyestuff corresponding to Formula 7 is coated as a thin layer onto an anodically oxidized aluminum foil. After drying the layer, it is exposed under a negative original. Thereby, the light struck areas of the layer are hardened. The exposed layer is then developed by rinsing with water, which causes the areas not struck by light to be removed. Thus an orange colored hardened positive colloid image remains on the aluminum foil.

The diazo compound corresponding to Formula 7 is prepared as follows:

3.4 g. of the diazo dyestuff obtained by coupling a tetrazotized solution of benzidine-2,2′-disulfonic acid with 2 moles of 2,7-amino-naphthol (in a solution rendered alkaline by means of sodium carbonate), are suspended in 40 cc. of water and then dissolved by adding dilute sodium lye. To the solution of the azo dyestuff, thus prepared, there is added, first a suspension of 5.4 g. of naphthoquinone-(1,4)-diazide-(4)-2-sulfochloride in 40 cc. of dioxane, and then, 8 g. of chalk. The reaction mixture is heated for 1 hour to 70° C., while constantly agitating. The warm mixture is rendered Congo-acid by adding hydrochloric acid, and then filtered while hot. The filtrate is washed with hot water and purified by dissolving it twice in dioxane and re-precipitating it by adding water.

*Example 9*

A solution containing 0.1 g. of the diazo compound corresponding to Formula 8, in 10 cc. of water, to which 15 drops of a 5% sodium bicarbonate solution had been added, is mixed with 20 cc. of a 3% aqueous gelatine solution. By means of a plate whirler, this solution is coated as a thin layer onto an anodically oxidized aluminum plate and then dried at moderate warmth. After drying, the layer is exposed under a negative original and then developed by means of luke-warm water. A positive tanned image is obtained.

A similar result is obtained when the gelatine solution mentioned above is replaced by the same quantity of a 1% aqueous solution of a highly viscous polyvinyl pyrrolidone, repeating the procedure as described above.

The 4,4′-bis-(naphthoquinone-(1″,4″)-diazide-(4″)-6″-sulfonylamino)-diphenyl-3,3′-dicarboxylic acid corresponding to Formula 8 is prepared as follows:

2.7 g. of benzidine-3,3′-dicarboxylic acid are dissolved in 30 cc. of water, to which 1.6 g. of sodium bicarbonate had been previously added. To this solution, there is added first 2.5 g. of chalk and then, at a temperature of 40–50° C. and dropwise, while agitating, a solution of 7.5 g. of 1-(carbethoxy)-hydroxy-4-nitro-naphthalene-6-sulfochloride in 60 cc. of acetone. After 5 hours, the reaction is completed. After adding 280 cc. of n/2 sodium lye the reaction mixture is heated for two hours on a water bath. After boiling for a short time the mixture is nuchared, and the reddish-brown solution, thus obtained is reduced to the 4,4′-bis-(1″-hydroxy-4″-amino-naphthalene-6″-sulfonyl-amino)-diphenyl-3,3′-dicarboxylic acid by adding 15 g. of sodium dithionite. During this process the former reddish-brown solution turns to a light yellow. If this yellow reduction solution is acidified to a pH of 5, the reduction product separates as a gray precipitate.

2 g. of this amino hydroxy compound are dissolved in a mixture consisting of 20 cc. of dimethyl formamide and 6 cc. of 16% hydrochloric acid. At a temperature between 0 and 5° C., 4 cc. of a 20% sodium nitrite solution are dropwise added to the solution while stirring. After stirring for two hours, part of the diazo compound corresponding to Formula 8 precipitates. For complete precipitation, 60 cc. of water are added to the diazotization mixture. The light-yellow diazo compound is drawn off, washed with water, and dried at moderate heat.

*Example 10*

0.1 g. of the zinc salt of the diazo compound corresponding to Formula 1 and 1 g. of highly viscous polyvinyl pyrrolidone are dissolved in 100 cc. of dimethyl formamide, and a layer of this solution is coated onto an anodically oxidized aluminum foil by means of a plate whirler. After drying the coated layer at elevated temperature, it is exposed under an original and then developed by rinsing with water. Thereby, those areas of the layer which were not struck by light and thus are unhardened, are removed. A negative tanned image of the original is obtained.

The zinc salt of the compound corresponding to Formula 1 is prepared by mixing 1 g. of the compound corresponding to Formula 1, dissolved in 200 cc. of water, with 5 g. of zinc chloride, and heating the mixture to about 70–80° C., whereupon the zinc salt precipitates. It is drawn off, washed with water, and dried. The zinc salt of the compound corresponding to Formula 1 is insoluble in water, hardly soluble in alcohol but soluble in dimethyl formamide.

*Example 11*

A backing paper suitable for making pigment paper is coated with the solution mentioned in Example 1, and containing 1.5 g. of the sodium salt of the diazo compound corresponding to Formula 1 and 10 g. of gelatine in 90 cc. of water. The coating is then dried. The paper, thus sensitized, is exposed under a negative original and the exposed layer is then transferred onto a copper roller by the method customary in the intaglio printing art.

*Example 12*

0.3 g. of the disodium salt of the diazo compound 1,5-bis-(naphthoquinone-(1′,4′)-diazide-(4′)-2′-sulfonylamino)-naphthalene-3,7-disulfonic acid, corresponding with Formula 9 are dissolved in 100 cc. of a 3% aqueous solution of gelatin. An aluminum foil which has been mechanically roughened by brushing is coated with the light-sensitive gelatin solution by means of a plate-whirler. Subsequently the coated foil is dried by means of warm air. The light-sensitive layer is then exposed to light under a negative transparent original, e.g. at an arc lamp of 18 amps./120 v. Having been exposed to light, the light-sensitive layer is colored with a 2% aqueous solution of crystal violet (Schultz, Farbstofftabellen, 7th edition, 1st supplementary volume, page 27, No. 785). Development of the image can be effected by bathing the exposed foil in water having a temperature of 40° C. or by rinsing with water. A positive gelatin image remains on the foil. The developed foil is dried and can now be used for the production of stencils or as a printing plate.

The production of the disodium salt of the diazo compound corresponding with Formula 9 is effected as follows: 4.0 g. of 1,5-diamino-naphthalene-3,7-disulfonic acid are dissolved in 50 cc. of water. The solution is neutralized with a 10% solution of caustic soda. 10 g. of chalk and the suspension of 6.7 g. of naphthoquinone-(1,4)-diazide-(4)-2-sulfochloride in 50 cc. of dioxane are added to the solution and the mixture is stirred for one hour while heating to a temperature of 60° C. After cooling the reaction mixture in ice, the reaction product is sucked off and dissolved in a mixture consisting of 25 cc. of a 10% sodium carbonate solution, 50 cc. of water and 20 cc. of dioxane while heating to a temperature of 50° C. The solution is treated with animal charcoal, filtered and sodium chloride is added to the filtrate. The disodium salt of the diazo compound corresponding with Formula 1 precipitates in form of a yellowish brown substance, which is separated, dissolved in glycolmonomethyl ether and re-precipitated by adding ethyl acetate to the solution.

*Example 13*

A solution containing 1.5% of highly viscous polyvinyl pyrrolidone and 0.15% of the disodium salt of the diazo compound 2,2′-bis-(naphthoquinone-(1″,4″)-diazide-(4″)-2″-sulfonyl-amino)-diphenyl-4,4′-disulfonic acid corresponding with Formula 10 dissolved in a 50% aqueous ethyl alcohol is applied to an aluminum or zinc plate which had been mechanically roughened by brushing. Further treatment of the coated plate, viz. drying by means of warm air, exposing under a negative transparent original and development is effected as described in Example 1. A plate with blue colored positive image is obtained, which can be used for the production of stencils.

The disodium salt of the compound corresponding with Formula 10 is prepared as follows:

10 g. of chalk and the suspension of 6.7 g. of naphthoquinone-(1,4)-diazide-(4)-2-sulfochloride in 50 cc. of dioxane are added to the solution of 4.85 g. of the sodium salt of 2,2′-diamino-diphenyl-4,4′-disulfonic acid in 50 cc. of water. The mixture is heated for one hour to a temperature of 60° C. and then cooled down in ice. The liquid is separated from the solid precipitate and the residue left on the filter is then dissolved in a mixture consisting of 25 cc. of a 10% sodium carbonate solution, 50 cc. of water and 20 cc. of dioxane, while heating to a temperature of 50° C. The solution is treated with animal charcoal and then filtered. By adding sodium chloride to the filtrate, the disodium salt of the diazo compound corresponding to Formula 10 is precipitated from the filtrate in form of a light-yellow substance. This substance is separated and recrystallized from a 50% aqueous alcohol.

*Example 14*

0.3 g. of the disodium salt of the diazo compound benzidine-N,N′-bis-[2″,4″-di-(naphthoquinone-(1‴,4‴)-diazide-(4‴)-2‴-sulfonamido)-6″-benzene sulfonic acid] corresponding to Formula 11 are dissolved in 100 cc. of a 3% aqueous gelatin solution. An aluminum foil, which has been mechanically roughened by brushing, is coated with the light sensitive gelatin solution by means of a plate whirler. Subsequently, the coated foil is well dried by means of warm air. The light sensitive foil is then exposed under a negative transparent original, e.g. at an arc lamp of 18 a./120 v. The development of the image is obtained by rinsing the exposed foil for a short time with water having a temperature of 40° C. A positive image remains on the foil which is colored with a 1% aqueous solution of the dyestuff "Victoria-blue B rein" (see G. Schultz, "Farbstofftabellen," 7th edition, volume EI, page 28, No. 822). Then the foil is rinsed once more with warm water and thus a blue-colored positive image is obtained, which after having been dried, can be used as a printing plate or for the production of stencils.

The disodium salt of the diazo compound corresponding to Formula 11 is prepared as follows:

20 g. of the disodium salt of 1-chloro-2,4-dinitrobenzene-6-sulfonic acid and 6.1 g. of benzidine are added to the solution of 15 g. of soda in 400 cc. of water and the mixture is then boiled for 8 hours. After the reaction mixture has cooled down, the precipitate is sucked off and washed with little water. 14 g. of the disodium salt of benzidine-N,N-bis-[2″,4″-dinitro-benzene-6″-sulfonic acid] thus obtained are dissolved in 200 cc. of dimethyl formamide and are then reduced with hydrogen to the corresponding tetraamino compound in an autoclave, using Raney-nickel as the catalyst. This tetraamino compound is precipitated with ether and the oily product obtained is digested with acetone, whereby it solidifies. Yield=8 g.

3 g. of this compound are suspended in 30 cc. of water and neutralized with a 10% aqueous hydrochloric acid. To this mixture 10 g. of chalk and the suspension of 5.37 g. of naphthoquinone-(1,4)-diazide-(4)-2-sulfochloride in 40 cc. of dioxane are added and the reaction mixture is heated to a temperature of 45° C. for one hour. After the reaction mixture has cooled down, the precipitate is sucked off and dissolved in a solution containing 40 cc. of water, 20 cc. of a 10% soda solution and 10 cc. of dioxane, while heating to a temperature of 50° C. The solution is treated with animal charcoal, filtered, and by adding sodium chloride, the diazo compound separates from the filtrate. Purification of the diazo compound is obtained by dissolving the diazo compound in glycol monomethyl ether and reprecipitating it from the solution by the addition of ether. The disodium salt thus obtained is a brown powder.

This application is a continuation-in-part of application Serial No. 566,093, filed February 17, 1956.

What is claimed is:

1. Light-sensitive material comprising a base material coated with a layer comprising an organic colloid and a compound having the formula $$R—SO_2—NH—R_1—R_2—R_3—NH—SO_2—R_4$$

in which R and $R_4$ are quinone-(1,4)-diazide radicals, $R_1$ and $R_3$ are arylene groups, and $R_2$ is a radical selected from the group consisting of ethylene,

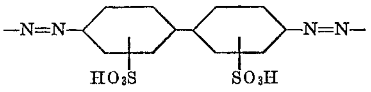

and

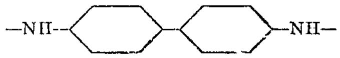

$R_1$, $R_2$, and $R_3$ taken together form a linkage selected from the group consisting of a fused ring arylene group and a diphenylene group.

2. Light-sensitive material comprising a base material coated with a layer comprising an organic colloid and a compound having the formula

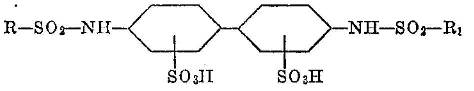

in which R and $R_1$ are quinone-(1,4)-diazide radicals.

3. Light-sensitive material comprising a base material coated with a layer comprising an organic colloid and a compound having the formula

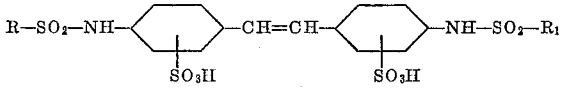

in which R and $R_1$ are quinone-(1,4)-diazide radicals.

4. Light-sensitive material comprising a base material coated with a layer comprising an organic colloid and a compound having the formula

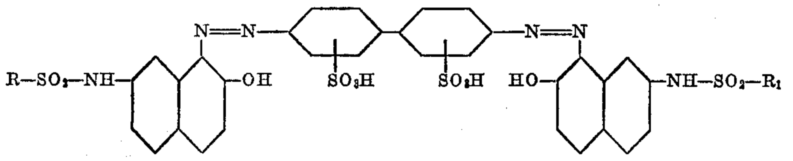

in which R and $R_1$ are quinone-(1,4)-diazide radicals.

5. Light-sensitive material comprising a base material coated with a layer comprising an organic colloid and a compound having the formula

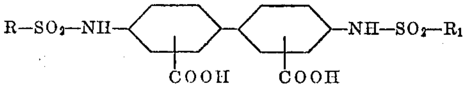

in which R and $R_1$ are quinone-(1,4)-diazide radicals.

6. Light-sensitive material comprising a base material coated with a layer comprising an organic colloid and a compound having the formula

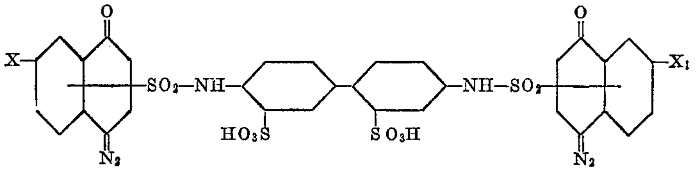

in which X and $X_1$ are selected from the group consisting of hydrogen and nitro radicals.

7. Light-sensitive material comprising a base material coated with a layer comprising an organic colloid and a compound having the formula

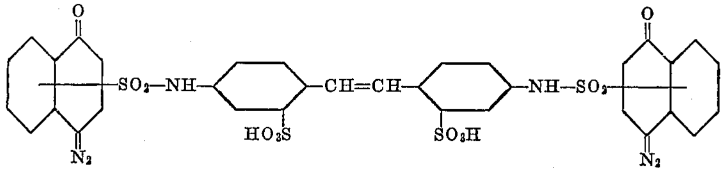

8. A method of making a light-sensitive material which comprises coating a base material with a layer comprising an organic colloid and a compound having the formula $$R—SO_2—NH—R_1—R_2—R_3—NH—SO_2—R_4$$

in which R and $R_4$ are quinone-(1,4)-diazide radicals, $R_1$ and $R_3$ are arylene groups, and $R_2$ is a radical selected from the group consisting of ethylene

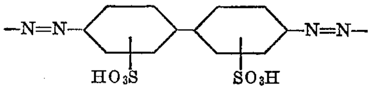

and

and $R_1$, $R_2$, and $R_3$ taken together form a linkage selected from the group consisting of a fused ring arylene group and a diphenylene group.

9. A method of making light-sensitive material which comprises coating a base material with a layer comprising an organic colloid and a compound having the formula

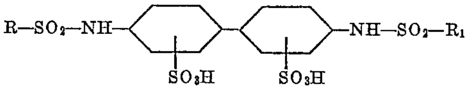

in which R and $R_1$ are quinone-(1,4)-diazide radicals.

10. A method of making light-sensitive material which comprises coating a base material with a layer comprising an organic colloid and a compound having the formula

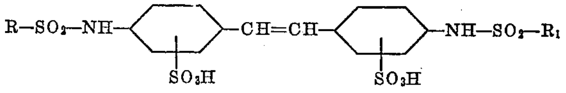

in which R and $R_1$ are quinone-(1,4)-diazide radicals.

11. A method of making light-sensitive material which comprises coating a base material with a layer comprising an organic colloid and a compound having the formula

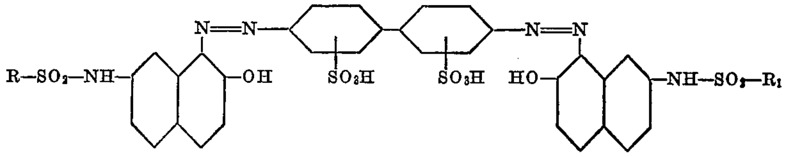

in which R and $R_1$ are quinone-(1,4)-diazide radicals.

12. A method of making light-sensitive material which comprises coating a base material with a layer comprising an organic colloid and a compound having the formula

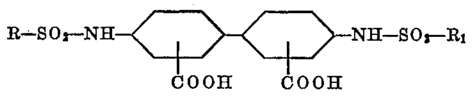

in which R and $R_1$ are quinone-(1,4)-diazide radicals.

13. A method of making light-sensitive material which comprises coating a base material with a layer comprising an organic colloid and a compound having the formula

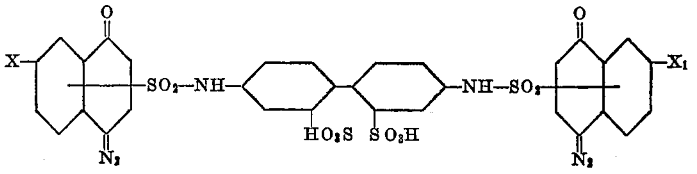

in which X and $X_1$ are selected from the group consisting of hydrogen and nitro radicals.

14. A method of making light-sensitive material which comprises coating a base material with a layer comprising an organic colloid and a compound having the formula

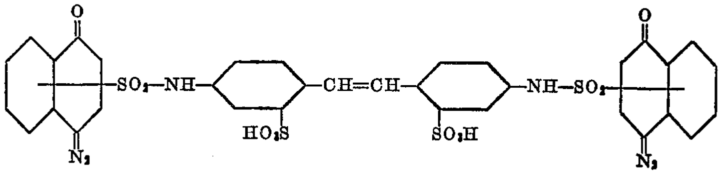

15. A method of developing light-sensitive material which comprises exposing a base material coated with a layer comprising an organic colloid and a compound having the formula $$R—SO_2—NH—R_1—R_2—R_3—NH—SO_2—R_4$$

in which R and $R_4$ are quinone-(1,4)-diazide radicals, $R_1$ and $R_3$ are arylene groups, and $R_2$ is a radical selected from the group consisting of ethylene,

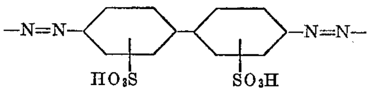

and

and $R_1$, $R_2$, and $R_3$ taken together form a linkage selected from the group consisting of a fused ring arylene group and a diphenylene group, to light under a master, and treating the exposed plate with water.

16. A method of developing light-sensitive material which comprises exposing a base material coated with a layer comprising an organic colloid and a compound having the formula

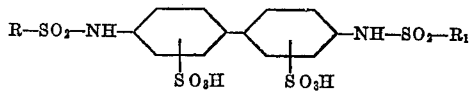

in which R and $R_1$ are quinone-(1,4)-diazide radicals, to light under a master, and treating the exposed plate with water.

17. A method of developing light-sensitive material which comprises exposing a base material coated with a layer comprising an organic colloid and a compound having the formula

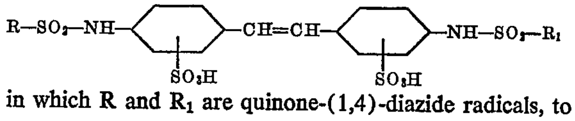

in which R and $R_1$ are quinone-(1,4)-diazide radicals, to light under a master, and treating the exposed plate with water.

18. A method of developing light-sensitive material which comprises exposing a base material coated with a layer comprising an organic colloid and a compound having the formula

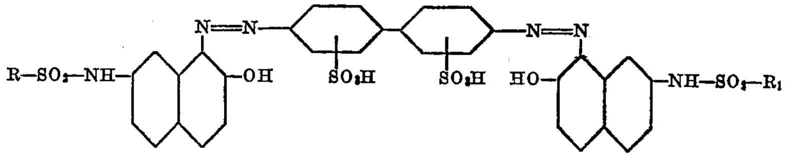

in which R and $R_1$ are quinone-(1,4)-diazide radicals, to light under a master, and treating the exposed plate with water.

19. A method of developing light-sensitive material which comprises exposing a base material coated with a layer comprising an organic colloid and a compound having the formula

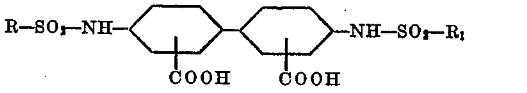

in which R and $R_1$ are quinone-(1,4)-diazide radicals, to light under a master, and treating the exposed plate with water.

20. A method of developing light-sensitive material which comprises exposing a base material coated with a layer comprising an organic colloid and a compound having the formula

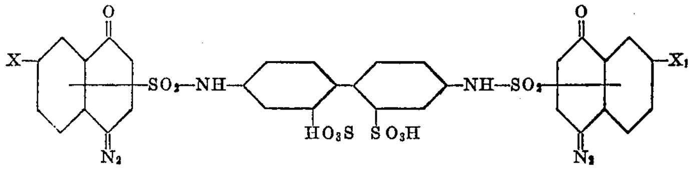

in which X and $X_1$ are selected from the group consisting of hydrogen and nitro radicals, to light under a master, and treating the exposed plate with water.

21. A method of developing light-sensitive material which comprises exposing a base material coated with a layer comprising an organic colloid and a compound having the formula

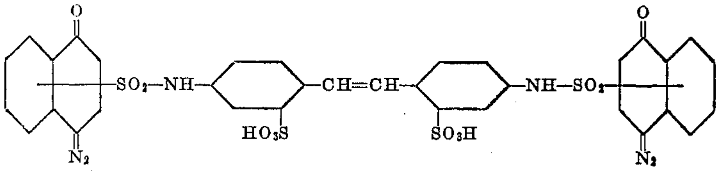

to light under a master, and treating the exposed plate with water.

22. Light-sensitive material comprising a base material coated with a layer comprising an organic colloid and a compound having the formula

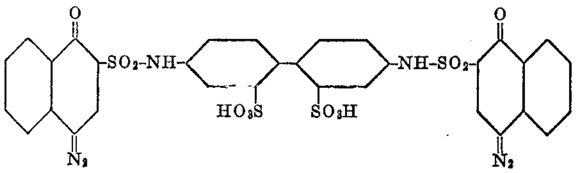

23. Light-sensitive material comprising a base material coated with a layer comprising an organic colloid and a compound having the formula

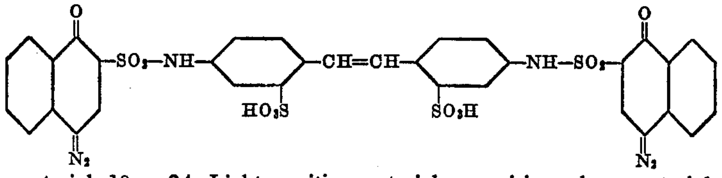

24. Light-sensitive material comprising a base material coated with a layer comprising an organic colloid and a compound having the formula

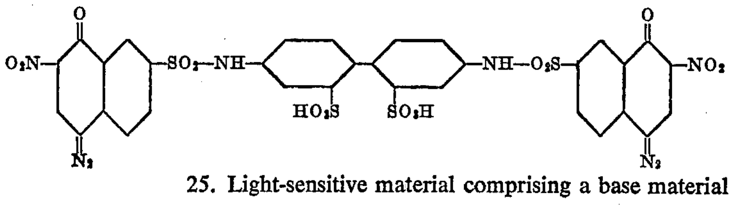

25. Light-sensitive material comprising a base material coated with a layer comprising an organic colloid and a compound having the formula

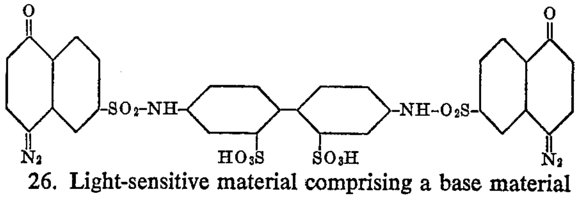

26. Light-sensitive material comprising a base material coated with a layer comprising an organic colloid and a compound having the formula

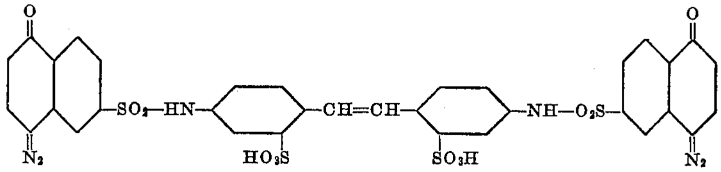

27. Light-sensitive material comprising a base material coated with a layer comprising an organic colloid and a compound having the formula

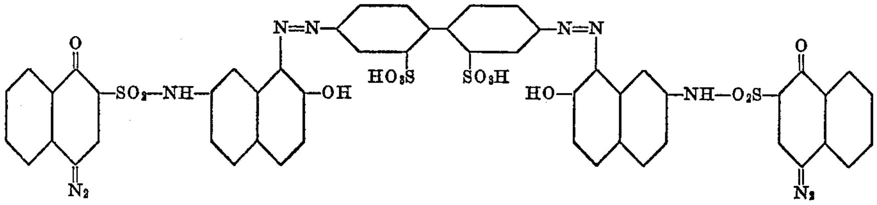

28. Light-sensitive material comprising a base material coated with a layer comprising an organic colloid and a compound having the formula

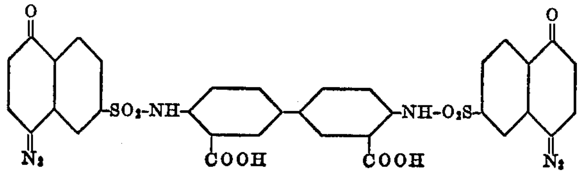

29. Light-sensitive material comprising a base material coated with a layer comprising an organic colloid and a compound having the formula

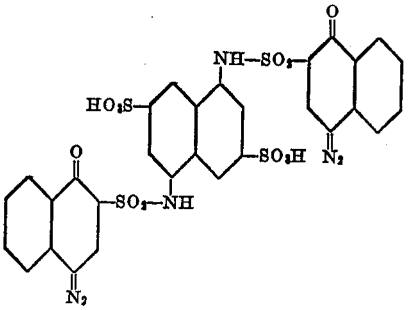

30. Light-sensitive material comprising a base material coated with a layer comprising an organic colloid and a compound having the formula

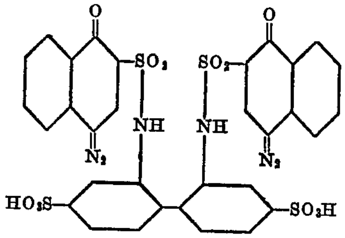

31. Light-sensitive material comprising a base material coated with a layer comprising an organic colloid and a compound having the formula

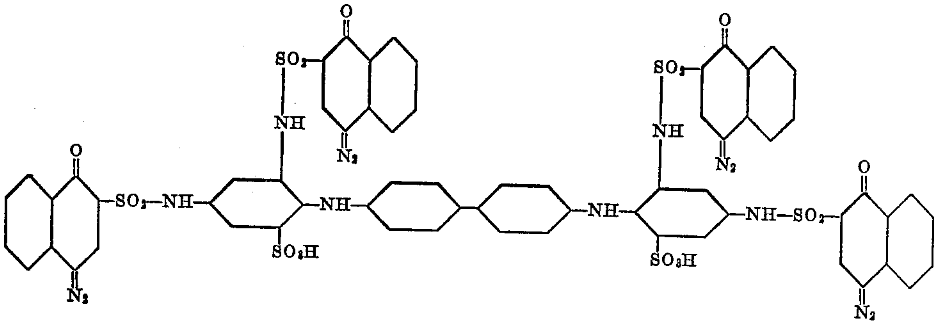

References Cited in the file of this patent

UNITED STATES PATENTS 2,754,209 Schmidt et al. ------------ July 10, 1956

FOREIGN PATENTS 706,028 Germany --------------- Mar. 24, 1954